United States Patent [19]

Logan

[11] 4,231,659
[45] Nov. 4, 1980

[54] METHOD OF MAKING AN OVERLAY MASK AND A PRINTING PLATE THEREFROM

[75] Inventor: David J. Logan, Glastonbury, Conn.

[73] Assignee: The Gerber Scientific Instrument Company, South Windsor, Conn.

[21] Appl. No.: 29,358

[22] Filed: Apr. 11, 1979

[51] Int. Cl.³ ............................................. G03B 41/00
[52] U.S. Cl. .................................. 355/132; 354/4; 355/54
[58] Field of Search ................ 355/53, 54, 40, 132; 354/4

[56] References Cited

U.S. PATENT DOCUMENTS

| | | | |
|---|---|---|---|
| 3,330,182 | 7/1967 | Gerber et al. | 354/4 |
| 3,702,922 | 11/1972 | Hall, Jr. et al. | 354/4 X |
| 3,881,098 | 4/1975 | Rich | 354/4 X |
| 4,109,256 | 8/1978 | Ohnishi | 354/4 |

Primary Examiner—Richard A. Wintercorn
Attorney, Agent, or Firm—McCormick, Paulding & Huber

[57] ABSTRACT

A method of making overlay masks for photoetching of printing plates with printing matter utilizes a photoplotter having an optical exposure head to precisely expose a photosensitive film in a predetermined mask pattern. The pattern may include symbols, "knock out" windows for cropping pictures in both grey and color halftones, and line work such as framing for pictures and other printing matter.

16 Claims, 6 Drawing Figures

METHOD OF MAKING AN OVERLAY MASK AND A PRINTING PLATE THEREFROM

BACKGROUND OF THE INVENTION

The present invention relates in general to the printing industry and more particularly to a method of making overlay masks for photoengraving printing plates.

Present day printing processes which produce high quality pictorial or other printed matter on fine paper, such as found in magazines, catalogues and other publications prepared in large numbers, may require as many as eight or more overlay masks to produce a single printing plate. The masks separate printed matter on various portions of a page and are also used for a number of other purposes.

For example, if a grey-tone picture is to appear on a portion of a page together with other word matter, it may be necessary to expose the printing plate at least twice in the photoengraving process, once to generate the grey-tone images from a halftone transparency, and again to expose the word matter. During each exposure, those portions of the page which are reserved for other material may not be exposed and hence are covered by means of an overlay mask having opague portions in a pattern corresponding to the reserved areas. Additionally, halftone plates for both the grey and colored pictures must be cropped in order to define a sharp edge pattern. Masking is particularly important in the case of color separation halftone plates since the masking insures that each color halftone has identical borders and the borders all fall into registration when printed.

Overlay masks also are utilized to produce framing and other line work which divide various areas of a page into sections, or frame pictures and word matter. For example, a vertical bar dividing a page into a right-hand and a left-hand portion may be photographically etched in a printing plate by means of a mask that is opague except for the bar itself. Such a mask may be trimmed and pasted together with other masks defining the word matter, and a single exposure of the printing plate with the pasted masks is then possible.

A frame such as a rectangular frame surrounding a picture or other printed matter is sometimes produced by means of two masks, one having an opague rectangular area and transparent surroundings, and the other having a transparent rectangular area of slightly larger size surrounded by an opague area. When two such masks are positioned together in proper registration over a photosensitive surface of a film or plate, only the transparent area between the two rectangles of different size is exposed on the sensitive surface to form a frame.

Making overlay masks for printing plates in the past has largely been a manual process. A rubylith sheet material consisting of a transparent backing coated with a strippable layer of opague material is stripped in accordance with the desired mask pattern so that the opague material remains in those areas where no exposure of the photographic plate or film is desired. The stripping of the opague material from the transparent backing is done by cutting the outline of a line, frame or box with a sharp blade which only penetrates the opague material and leaves the transparent backing intact. The cutting of a thin bar or frame requires substantial effort since not only the dimensions of the outline must be accurately controlled, but also the location of the outline may have to be coordinated with other masks. For example, if a frame is desired about a halftone picture with no spacing between the edge of the halftone and the frame, the inner edge of the frame must correspond precisely with the "knock out" box or window prepared in another mask for the halftone picture. Also, if two halftone pictures must abut one another with no space between, the "knock out" windows for each picture are produced in two separate overlay masks, and precise correlation of the windows in each mask is needed at the common edge of the pictures.

The above-described examples are merely a few of many masking techniques which require precise, accurately prepared overlay masks for producing printing plates.

It is an object of the present invention to provide a new process for making overlay masks by means of a precisely controlled photoplotter.

SUMMARY OF THE INVENTION

The present invention resides in a method of producing an overlay mask for photographic engraving of a printing plate.

The method employs a photoplotter having a photoexposure head that moves relative to a photosensitive film. The film is mounted in the photoplotter and the plotter is programmed to move the head and film relative to one another in accordance with a desired mask pattern. During movement a beam of light is directed from the photoexposure head of the plotter onto the photosensitive surface of the film to cause the film surface to be appropriately exposed.

After exposure, the photosensitive surface is developed by conventional photgraphic developing techniques, and the resulting product is an overlay mask having opague and transparent areas corresponding to the desired mask pattern generated by the photoplotter. The mask is then employed in a conventional photoengraving process to prepare a printing plate for use in subsequent printing operations.

The method offers the advantages of high accuracy plotting in the preparation of overlay masks for printing plates. Frames and line work can be generated directly by the plotter with accurate control over dimensions as well as the location of lines and other graphics within the mask areas. In addition, the photoplotter executes the plotting of a mask pattern at a high rate of speed and may be readily reprogrammed for other mask patterns. A significant reduction in job time and the improved reliability, flexibility and accuracy of a program-controlled instrument offer significant advances in the overlay mask art.

DESCRIPTION OF THE PREFERRED EMBODIMENTS

Figure 1:
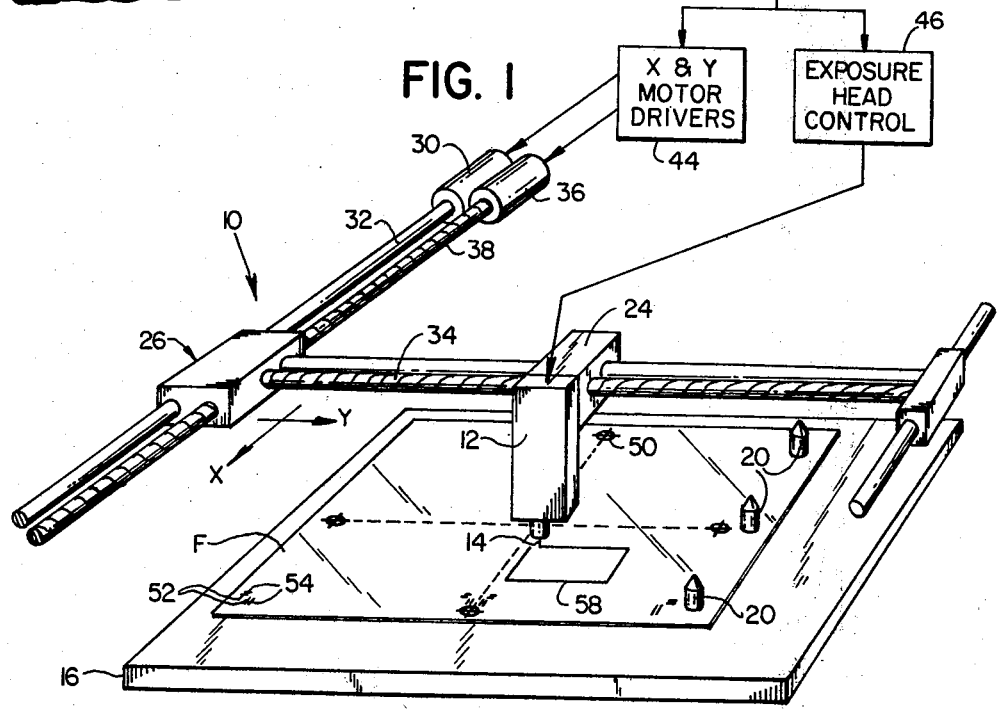
FIG. 1 is a perspective view of a photoplotter in schematic form and illustrates the method of producing an overlay mask for a printing plate in accordance with the present invention.

FIG. 1 illustrates a program-controlled photoplotter for producing overlay masks in accordance with the present invention. The plotter is illustrated schematically and is of the type described and shown in greater detail in U.S. Pat. No. 3,330,182 having the same assignee as the present invention.

The photoplotter, generally designated 10, includes a photooptical exposure head 12 that projects a beam 14 of light onto the photosensitive surface of a film F in low-light surroundings. The film F when selectively exposed and developed becomes the overlay mask used to produce printing plates by conventional photoengraving techniques. The film F is supported on a plotting table 16 having a plurality of positioning pins 20 which extend through corresponding holes in the film and precisely hold the film in a reference position relative to the table 16 and remaining portions of the photoplotter. Also, the film supporting surface may be porous and have a vacuum applied from beneath it to securely hold the film to its surface after it has been registered on the surface by the positioning pins 20. It should be understood that the film may be of the positive or negative type depending upon the desired masking features and corresponding photosensitivity of the plate or film from which a plate is engraved.

The optical exposure head 12 is suspended above the plotting table 16 by means of a Y-carriage 24 which moves relative to the table in the illustrated Y-coordinate direction and an X-carriage 26 straddling the table and movable relative to the table in the illustrated X-coordinate direction. The Y-carriage 24 is supported by the X-carriage 26 and is moved in the Y-coordinate direction by a drive motor 30 through a splined shaft 32 and a lead screw 34 coupled to the splined shaft 32 at the one side of the X-carriage. The X-carriage 26 is translated in the illustrated X-coordinate direction by means of a drive motor 36 and a lead screw 38.

Displacement of the exposure head 12 by the carriages 24 and 26 is controlled by a programmed processing unit 40 into which a mask program is placed through an input device 42 which accepts programs in the form of cards, tapes, discs and other program media. From the mask program the processing unit determines the carriage motions necessary to expose the film F in accordance with a predetermined mask pattern and applies appropriate signals to the X and Y motor drivers 44 connected to the drive motors 30 and 36 to produce the motions. Additionally, the processing unit generates commands that are transmitted to an exposure head control 46 to govern the operation of the exposure head 12. Signals transmitted from the control 46 to the head 12 regulate such parameters as the time during which the light beam 14 is turned on, the intensity of the light beam, the cross sectional size of the beam, and other factors which are necessary to produce a programmed exposure of the film F.

In the process of producing an overlay mask with the photoplotter 10, a film F is positioned on the plotting table 16 with the photosensitive surface up, and is held in precise registration with the table by the alignment pins 20. The carriages 24 and 26 translate the head 12 relative to the film F and the beam 14 is appropriately energized to expose the photosensitive surface of the film in accordance with the mask pattern.

A typical mask pattern is illustrated on the film F. The pattern, however, is shown merely for purposes of explanation, since the pattern is not actually visible during the exposure operation and does not become visible until the film has been processed through subsequent photographic developing steps. Some of the illustrated markings may be found on various masks and include registration marks 50 for proper location of the mask in subsequent steps, "bleed" marks 52 defining the necessary extension of pictures printed on the edge of a page and trim lines 54 defining the cut edges of a page. The particular mask illustrated would be utilized for making a four-page plate, the boundaries of each edge being generally designated by dotted lines. The alignment marks 50 and bleed and trim marks 52 and 54 may be generated by displacing the exposure head 12 relative to the film F while the beam 14 of light is projected onto the photosensitive surface of the film. As the beam traces a pattern corresponding to the mark, the film is exposed accordingly. Preferably, however, in a photohead of the type described in U.S. Pat. No. 3,330,182 referenced above special slides or flash pads bearing the desired marks may be positioned along the beam axis and the beam is then flashed while the head 12 is stationary at a desired location. The entire mark or other symbol is thereby exposed instantaneously at the desired location.

To generate a "knock out" box or window 58 for blocking out a picture space or cropping a picture, or to develop a picture or word frame, the exposure head 12 is moved relative to the sheet material while the light beam 14 traces or draws the geometric pattern on the photosensitive surface of the film. The spot produced by the projected beam moves relative to the film surface and exposes each location over which the spot passes. By controlling the relative movement of the head 12 in accordance with the mask program placed in the processing unit 40, the spot generates a window or frame of any desired size and configuration. The corners of a rectangular window or frame may be rounded with any desired radius, and other geometric contours may be added or substituted where desired.

Figure 2:
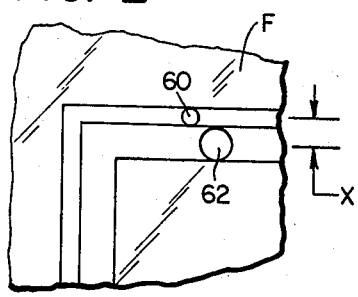
FIG. 2 is a fragmentary view of a film exposure illustrating one manner in which the mask for a frame is generated by the photoplotter of FIG. 1.

If a picture frame of predetermined thickness is required, the program of the processing unit 40 may cause the head 12 to scan the spot of light around the desired periphery of a picture, and with each circumnavigation of the perimeter offset the spot to increase the frame thickness as shown in FIG. 2. To establish sharp corners at the outer limits of such a frame, the beam of light is reduced in size by positioning a relatively small aperture in the beam. A correspondingly small spot 60 is projected on the film surface and the outer limits of the frame are traced. For the remaining portion of the frame, a larger aperture is positioned in the beam so that a correspondingly larger spot 62 exposes the film surface at an increased rate. During successive excursions of the frame it is preferable that the paths tracked by the spots 60 and 62 be offset by a distance X less than the radii of the two spots to overlap adjacent traces and avoid striations in the lines of the frame. Since the positioning of spots on the film can be controlled with high accuracy, and since programming of processing units for offset is well known, the generation of a rectangular frame or other line features by this method is easily accomplished. For the same reason, it is a relatively simple process to accurately define both the inner and outer limits of a frame or window so that masking precisely matching picture dimensions can be obtained. Furthermore, slightly undersize or oversize windows may be generated if desired.

Figure 3:
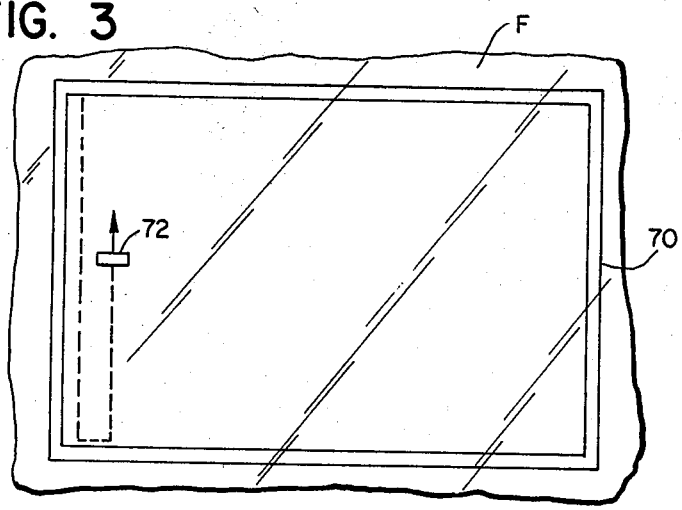
FIG. 3 is another fragmentary view of a film exposure showing the manner in which a "knock out" window is generated by the photoplotter.

FIG. 3 illustrates one process by which the photoplotter 10 produces a window 70 defined by a large block area exposure of solid or uninterrupted extent. The periphery of the window 70 may initially be defined with a frame by the process disclosed in connection with FIG. 2. Thereafter a narrow slit is inserted into the light beam to produce a rectangular spot 72 on the photosensitive film surface, and the spot 72 is scanned in a raster pattern over the film surface within the previously generated frame to effectively "paint" the interior area of the frame and thus fully expose the film within the frame area. The raster scan is preferably carried out by overlapping adjacent sweeps of the beam slightly to avoid a striated appearance. The raster scanning operation may be carried out without the initial frame although care must be taken that the scanning motion is accurately controlled near the edges of the window 70 to insure a smooth and pleasing appearance.

Still other types of windows, framing, line work for page divisions, underscoring and other geometric forms may be generated by appropriate programming of the processing unit 40.

Once a film has been exposed with the desired mask pattern, the film F is developed by conventional techniques and either a positive or negative of the mask is prepared depending upon the eventual use of the mask.

Figure 4:
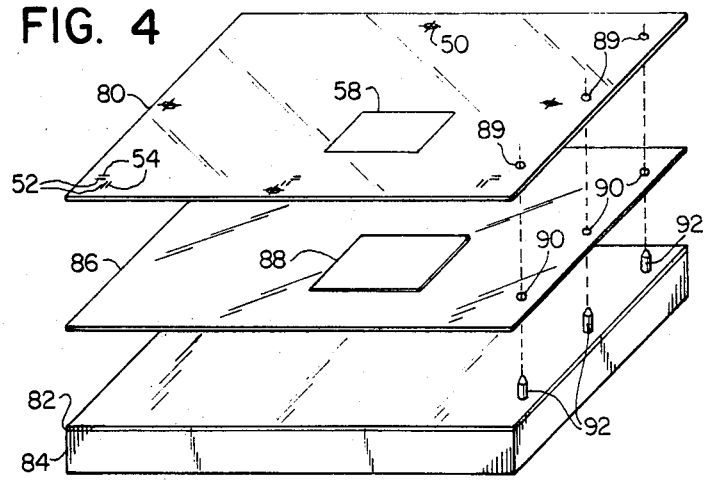
FIG. 4 is an exploded illustration of a laminated assembly and shows how the overlay mask produced from the photoplotter in FIG. 1 is used to prepare a printing plate in a photoengraving process.

FIG. 4 illustrates the use of a mask 80 in exposing the photosensitive surface of an emulsion 82 on a printing plate 84. The mask is shown with the graphic markings illustrated and described on the film F in FIG. 1. The mask 80 will be regarded in this discussion as a negative in which all of the markings represent transparent or light-transmitting features including the area within the window 58, and the remaining portion of the mask is opaque in contrast due to the developed emulsion.

The mask 80 is placed in a laminated assembly or stack with the printing plate 84 and a carrier sheet 86 on which a halftone transparency 88 is held in a desired position. The halftone transparency may be negative or positive depending on the type of emulsion 82 on the printing plate. The carrier sheet 86 is transparent so that light will pass through the sheet in those areas where the transparent markings or window of the mask 80 permit. Registration holes 88 and 90 are provided along corresponding edges of the mask 80 and carrier sheet 86 respectively, and a corresponding set of aligning pins 92 project upwardly from the printing plate 84 to receive the sheet and mask in aligned relationship.

Figure 5:
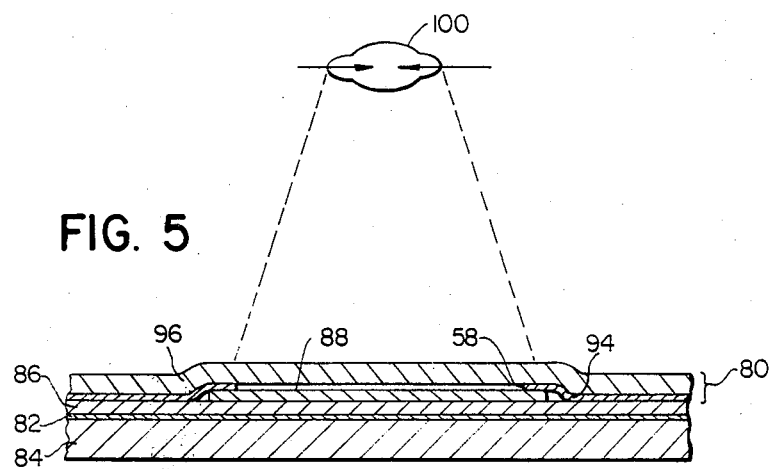
FIG. 5 illustrates the laminated assembly of FIG. 4 in section and shows the manner in which the overlay mask is employed during exposure of a printing plate in the photoengraving process.

FIG. 5 illustrates the laminated assembly in section when it has been compressed or compacted by means of vacuum or other means to press the adjacent layers together in close relationship. It will be observed that the mask 80 is comprised by a layer of developed emulsion 94 which is opaque and a more substantial base layer 96 which is transparent. The emulsion is placed in adjacent relationship with the carrier sheet 86 and the halftone transparency 88 so that non-parallel light rays passing through the mask 80 do not have a significant opportunity to distort the boundaries of the window 58 defined by the emulsion. Once the laminates have been pulled snugly together as shown in FIG. 5, the photosensitive emulsion layer 82 on the printing plate 84 is exposed by means of an arc lamp 100 through the halftone transparency 88 and the other transparent markings in the mask. The images of the transparency and markings are exposed in the emulsion layer 82 and by conventional photoengraving techniques, such images are eventually engraved in the printing plate 84.

Figure 6:
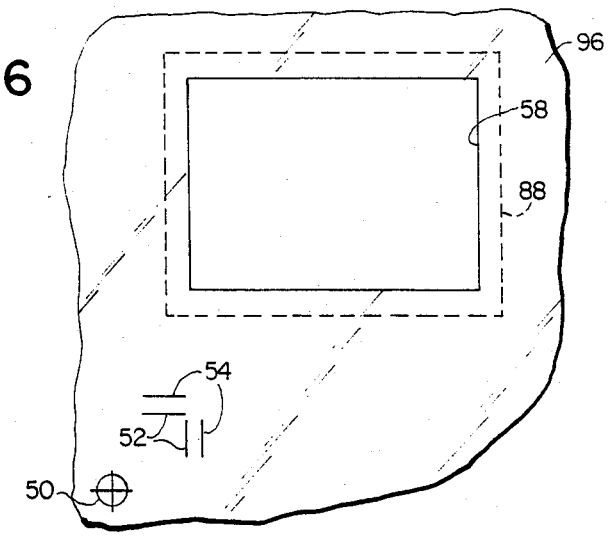
FIG. 6 is a fragmentary plan view of the assembly shown in FIG. 4.

It will be observed in FIG. 6 that the window 58 is placed over the halftone transparency 88 so as to crop the edges of the transparency and thereby precisely define the location and size of a picture engraved on the plate 84. With a precisely located picture, there is no fear of overlap on other printed matter that is produced by the same plate 84 or by other plates that place information on the same page as the picture. Also if the halftone transparency 88 is a color separation halftone, the window 58 defining the limits of the pictorial matter insures that each of the halftone separations has the same size and positioning relative to the reference marks 50 and the alignment pins 92 in FIG. 4.

Accordingly, a method has been disclosed for producing an overlay mask for a printing plate and the plate itself wherein the mask is photographically generated by means of an accurately controlled photoplotter. The plotter directly exposes a photosensitive film with the desired markings and thereby allows certain graphic information to be directly generated by the automatic plotter controls. Such controls may be either numeric or analogue since both such controls are capable of controlling photohead movement relative to the exposed film. Programs for controlling the plotter are readily revised or changed to produce an infinite variety of graphic images. The photoplotter also reduces the time for generating such a mask to a fraction of that required by the older manual techniques.

While the present invention has been described in several embodiments, it should be understood that numerous modifications and substitutions can be made. The invention is not limited to the particular graphic images that have been shown by way of example in the several masks illustrated in the drawings since the plotted images are determined by the program input to the processing unit 40 and new programs may be input as desired. Accordingly, the present invention has been described in several embodiments by way of illustration rather than limitation.

I claim:

1. A method of producing a printing plate with an overlay mask comprising:

placing a film having a photosensitive surface in an automatic precisely controlled photoplotter having an optical exposure head with the photosensitive surface of the film disposed for exposure by the head;

controllably moving the exposure head relative to the photosensitive surface of the film with accurate, predetermined motions, and simultaneously exposing the film surface with the exposure head to precisely expose the film in accordance with the pattern of a desired printing plate overlay mask with sharply separated transparent and opaque areas in linear, rectangular or other shapes that divide a plate into prescribed areas for receiving and not receiving printed matter through the mask;

developing the exposed film and producing the precisely exposed overlay mask with a mask pattern in contrasting transparent and opaque areas corresponding to the film exposure; and photoengraving a printing plate directly by means of the precisely exposed overlay mask for accurate disposition of printing information on the printing plate.

2. A method of producing a printing plate as defined in claim 1 wherein the steps of controllably moving and exposing the film surface comprise scanning a spot of light projected onto the photosensitive film surface from the exposure head across the film surface in an area to be exposed.

3. A method of producing a printing plate as defined in claim 2 wherein the step of scanning comprises scanning a spot of light across the photosensitive surface in adjacent and overlapping paths to expose an area having an uninterrupted extent.

4. A method of producing a printing plate as defined in claim 2 wherein the step of scanning includes scanning the spot of light across the film surface in adjacent, parallel paths to expose a block area of the film.

5. A method of producing a printing plate as defined in claim 2 wherein the step of scanning comprises scanning the spot of light in a rectangular path to expose a rectangular frame.

6. A method of making an overlay mask for photographic engraving of a printing plate comprising:
    mounting a photosensitive film in a programmable photoplotter having an exposure head for movement of the head and film relative to each other;
    programming the photoplotter with a mask program having data defining the precise dimensions and positioning of the graphic images desired in an overlay mask as applied to a printing plate;
    directing a beam of light from the exposure head of the plotter onto the photosensitive film to expose a spot on the film;
    moving the exposure head and film relative to one another in the photoplotter under program control to cause the spot of light to move over the film and expose the film in accordance with the precise dimensions and positioning defined in the mask program; and
    producing an overlay mask with the desired graphic images from the film exposed in the programmed photoplotter by developing the exposed film without supplemental reduction or enlargement of the image dimensions.

7. A method of making an overlay mask as defined in claim 6 wherein:
    the step of programming comprises programming the photoplotter with data defining areas of a printing plate reserved for word matter.

8. A method of making an overlay mask as defined in claim 6 wherein the programmed data defines the areas reserved for pictorial material.

9. A method of making an overlay mask as defined in claim 6 wherein the programmed data defines the limits of a halftone image on a printing plate.

10. A method of making an overlay mask as defined in claim 6 wherein the programmed data defines the limits of a color separation image on a printing plate.

11. A method of making an overlay mask as defined in claim 6 wherein the programmed data defines bleed marks for page-edge pictures.

12. A method of making an overlay mask as defined in claim 6 wherein the programmed data defines trim lines for page cutting.

13. A method of making an overlay mask as defined in claim 6 wherein the programmed data defines registration marks for mask positioning.

14. A method of making an overlay mask as defined in claim 6 wherein the steps of moving and directing the beam of light include scanning the beam of light over the photosensitive film with the beam scanning an area of uninterrupted extent.

15. A method of making an overlay mask as defined in claim 6 wherein the steps of moving and directing include exposing a frame image on the photosensitive film by circumnavigating the frame image with the beam spot and offsetting the beam spot on different excursions to increase the frame thickness.

16. A method of making an overlay mask as described in claim 6 wherein additional steps include placing a flash pad bearing an image corresponding to markings desired on the mask along the beam axis, holding the exposure head and film stationary relative to one another and then flashing the beam through the pad to expose the desired markings on the film.

* * * * *